United States Patent [19]
Katner

[11] 3,897,434
[45] July 29, 1975

[54] PYRAZOLO[1,5-C]QUINAZOLIN-5(6H)-ONES
[75] Inventor: Allen S. Katner, Indianapolis, Ind.
[73] Assignee: Eli Lilly and Company, Indianapolis, Ind.
[22] Filed: Apr. 12, 1974
[21] Appl. No.: 460,644

[52] U.S. Cl....260/256.4 Q; 260/283 R; 260/283 SY; 260/287 R; 260/289 CF; 260/310; 260/325; 424/250
[51] Int. Cl............................................. C07d 51/48
[58] Field of Search............................. 260/256.4 Q

[56] References Cited
UNITED STATES PATENTS
3,271,400   9/1966   Bernstein et al............. 260/256.4 Q Primary Examiner—Donald G. Daus
Assistant Examiner—David E. Wheeler
Attorney, Agent, or Firm—William E. Maycock; Everet F. Smith

[57] ABSTRACT

Pyrazolo[1,5-c]quinazolin-5(6H)-ones, useful as anti-inflammatory agents, immunosuppressants, or complement inhibitors, or as intermediates in the preparation of compounds useful as complement inhibitors, are prepared by reacting an activated acetylene with a 3-diazoindol-2(3H)-one.

12 Claims, No Drawings

PYRAZOLO[1,5-C]QUINAZOLIN-5(6H)-ONES

BACKGROUND OF THE INVENTION

This invention relates to pyrazolo[1,5-c]quinazolin-5(6H)-ones. More particularly, this invention relates to pyrazolo[1,5-c]quinazolin-5(6H)-ones useful as anti-inflammatory agents, immunosuppressants, or complement inhibitors, or as intermediates in the preparation of compounds useful as complement inhibitors, and to a process for preparing said pyrazolo[1,5-c]quinazolin-5(6H)-ones.

Mammals, both humans and animals, are known to suffer from various conditions involving inflammation with concomitant swelling, tenderness, decreased mobility, pain, and fever. While a number of anti-inflammatory agents are effective in the symptomatic treatment of such inflammatory conditions as rheumatoid arthritis, rheumatoid spondylitis, osteoarthritis, degenerative joint diseases, and the like, many such agents have a number of undesirable side effects, such as gastric irritation and the like.

Recently, immunosuppressant agents have come into prominence because of their use incident to transplants of organs from one human to another, especially heart and kidney transplants. It is, however, part of the defense mechanism of the body to remove foreign antigens (introduced by the transplanted organ) by the immune reaction which can result in the rejection of the transplant. Thus, in organ transplant operations, it has been necessary to give large doses of an immunosuppressant prior to the operation and continue treatment thereafter to prevent the host from rejecting the donor organ. While the immunosuppressant of choice has been azathioprine, the compound possesses numerous undesirable side effects, including severe and irreversible depression of the bone marrow, nausea, vomiting, diarrhea, anorexia, and jaundice.

Malfunction of the serum complement system is known to be involved in glomerulonephritis and is believed to be involved in serum sickness and in certain inflammatory diseases such as rheumatoid arthritis. Consequently, an effective complement inhibitor would substantially block the malfunction of the serum complement system and hence would be useful in the treatment of such diseases.

SUMMARY OF THE INVENTION

In accordance with the present invention, novel pyrazolo[1,5-c]quinazolin-5(6H)-ones are provided having the following general formula:

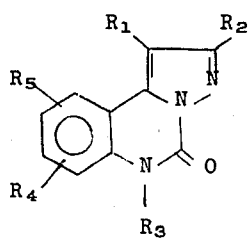

wherein $R_1$ is a monovalent group selected from the group consisting of hydrogen, $C_1$–$C_4$ alkyl, $C_1$–$C_3$ alkoxycarbonyl, phenyl, and monosubstituted phenyl in which the substituent is fluoro, chloro, bromo, $C_1$–$C_3$ alkyl, or $C_1$–$C_3$ alkoxy; $R_2$ is a monovalent group selected from the group consisting of carboxy, $C_1$–$C_3$ alkoxycarbonyl, acetyl, benzoyl, and monosubstituted benzoyl in which the substituent is fluoro, chloro, bromo, $C_1$–$C_3$ alkyl, or $C_1$–$C_3$ alkoxy; $R_3$ is a monovalent group selected from the group consisting of hydrogen, methyl, benzyl, phenyl, and monosubstituted benzyl and phenyl in which the substituent is methyl, trifluoromethyl, methoxy, fluoro, chloro, bromo, or methylsulfonyl; and $R_4$ and $R_5$ are monovalent groups independently selected from the group consisting of hydrogen, methyl, methoxy, fluoro, chloro, and bromo, with the limitation that $R_4$ and $R_5$ must be different unless each of $R_4$ and $R_5$ is hydrogen.

The pyrazolo[1,5-c]quinazolin-5(6H)-ones of the present invention are prepared by the process which comprises reacting an activated acetylene of the general formula,

$$R_1\text{—}C \equiv C\text{—}R_2$$

with a 3-diazoindol-2(3H)-one of the general formula,

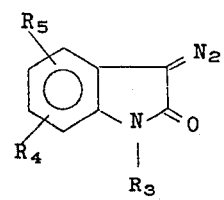

wherein $R_1$, $R_2$, $R_3$, $R_4$, and $R_5$ are as described hereinabove.

The pyrazolo[1,5-c]quinazolin-5(6H)-ones of the present invention are useful as anti-inflammatory agents, immunosuppressants, or complement inhibitors, or as intermediates in the preparation of compounds useful as complement inhibitors.

DETAILED DESCRIPTION OF THE INVENTION

The novel pyrazolo[1,5-c]quinazolin-5(6H)-ones of the present invention in general can be separated into three groups which are not mutually exclusive: (A) those compounds which are useful as anti-inflammatory agents or immunosuppressants, (B) those compounds which are useful as complement inhibitors, and (C) those compounds which are intermediates in the preparation of different compounds which also are useful as complement inhibitors. These three groups are referred to hereinafter as Group A, B, and C compounds, respectively.

With reference to the pyrazolo[1,5-c]quinazolin-5(6H)-one general formula described hereinabove, Group A compounds include those in which $R_1$ is hydrogen or $C_1$–$C_3$ alkoxycarbonyl; $R_2$ is $C_1$–$C_3$ alkoxycarbonyl, acetyl, benzoyl, or monosubstituted benzoyl in which the substituent is fluoro, chloro, bromo, $C_1$–$C_3$ alkyl, or $C_1$–$C_3$ alkoxy; and $R_3$ is hydrogen, methyl, benzyl, or monosubstituted benzyl in which the substituent is fluoro, chloro, or bromo; with the limitation that when $R_1$ is hydrogen and $R_2$ is $C_1$–$C_3$ alkoxycarbonyl, $R_3$ cannot be methyl.

Examples of such Group A compounds include, among others,

Ethyl pyrazolo[1,5-c]quinazolin-5(6H)-one-2-carboxylate,

Diethyl pyrazolo[1,5-c]quinazolin-5(6H)-one-1,2-dicarboxylate, 2-(4-Methylbenzoyl)pyrazolo[1,5-c]quinazolin-5(6H)-one,
2-(4-Chlorobenzoyl)pyrazolo[1,5-c]quinazolin-5(6H)-one,
Dimethyl 6-methylpyrazolo[1,5-c]quinazolin-5(6H)-one-1,2-dicarboxylate,
2-Benzoyl-6-methylpyrazolo[1,5-c]quinazolin-5(6H)-one,
2-(4-Methoxybenzoyl)-6-methylpyrazolo[1,5-c]quinazolin-5(6H)-one,
2-(4-Fluorobenzoyl)-6-methylpyrazolo[1,5-c]quinazolin-5(6H)-one,
2-(4-Chlorobenzoyl)-6-methylpyrazolo[1,5-c]quinazolin-5(6H)-one,
2-Acetyl-6-methylpyrazolo[1,5-c]quinazolin-5(6H)-one,
Methyl 6-(4-chlorobenzyl)pyrazolo[1,5-c]quinazolin-5(6H)-one-2-carboxylate,
Ethyl 6-(4-chlorobenzyl)pyrazolo[1,5-c]quinazolin-5(6H)-one-2-carboxylate,
Dimethyl 6-(4-chlorobenzyl)pyrazolo[1,5-c]quinazolin-5(6H)-one-1,2-dicarboxylate, and
2-(4-Chlorobenzoyl)-6-(4-chlorobenzyl)-pyrazolo[1,5-c]quinazolin-5(6H)-one.

Examples of preferred Group A compounds include,
2-(4-Chlorobenzoyl)pyrazolo[1,5-c]quinazolin-5(6H)-one[1,2],
2-Acetyl-6-methylpyrazolo[1,5-c]quinazolin-5(6H)-one[1],
2-(4-Chlorobenzoyl)-6-methylpyrazolo[1,5-c]quinazolin-5(6H)-one[2],
2-(4-Fluorobenzoyl)-6-methylpyrazolo[1,5-c]quinazolin-5(6H)-one[2],
Methyl 6-(4-chlorobenzyl)pyrazolo[1,5-c]quinazolin-5(6H)-one-2-carboxylate[1],
Dimethyl 6-(4-chlorobenzyl)pyrazolo[1,5-c]quinazolin-5(6H)-one-1,2-dicarboxylate[2], and
2-(4-chlorobenzoyl)-6-(4-chlorobenzyl)pyrazolo[1,5-c]quinazolin-5(6H)-one[2].

As stated hereinbefore, the Group A compounds are useful as anti-inflammatory agents or immunosuppressants. The precise activity of any given Group A compound can be determined readily by one having ordinary skill in the art. By way of illustration, in the examples of preferred Group A compounds listed above, those compounds which are active as anti-inflammatory agents are identified by the superscript 1; those compounds active as immunosuppressants are identified by the superscript 2. While the exception rather than the rule, some compounds, such as 2-(4-chlorobenzoyl)pyrazolo[1,5-c]quinazolin-5(6H)-one, are active both as anti-inflammatory agents and immunosuppressants.

Group B compounds are those in which $R_1$ is hydrogen or $C_1$–$C_3$ alkoxycarbonyl; $R_2$ is carboxy, $C_1$–$C_3$ alkoxycarbonyl, benzoyl, or monosubstituted benzoyl in which the substituent is fluoro, chloro, bromo, $C_1$–$C_3$ alkyl, or $C_1$–$C_3$ alkoxy; and $R_3$ is hydrogen, methyl, phenyl, benzyl, or monosubstituted phenyl or benzyl in which the substituent is methyl, trifluoromethyl, methoxy, fluoro, chloro, bromo, or methylsulfonyl. Examples of such Group B compounds include, among others, Ethyl pyrazolo[1,5-c]quinazolin-5(6H)-one-2-carboxylate,
Pyrazolo[1,5-c]quinazolin-5(6H)-one-2-carboxylic acid,
2-(4-Chlorobenzoyl)pyrazolo[1,5-c]quinazolin-5(6H)-one,
2-(4-Methylbenzoyl)pyrazolo[1,5-c]quinazolin-5(6H)-one,
Dimethyl pyrazolo[1,5-c]quinazolin-5(6H)-one-1,2-dicarboxylate,
Ethyl 6-methylpyrazolo[1,5-c]quinazolin-5(6H)-one-2-carboxylate,
2-Benzoyl-6-methylpyrazolo[1,5-c]quinazolin-5(6H)-one,
2-(4-Methoxybenzoyl)-6-methylpyrazolo[1,5-c]quinazolin-5(6H)-one,
Dimethyl 6-methylpyrazolo[1,5-c]quinazolin-5(6H)-one-1,2-dicarboxylate,
2-(4-chlorobenzoyl)-6-phenylpyrazolo[1,5-c]quinazolin-5(6H)-one,
Ethyl 6-[3-(trifluoromethyl)phenyl]pyrazolo[1,5-c]quinazolin-5(6H)-one-2-carboxylate,
Ethyl 6-(4-chlorobenzyl)pyrazolo[1,5-c]quinazolin-5(6H)-one-2-carboxylate,
6-(4-Chlorobenzyl)pyrazolo[1,5-c]quinazolin-5(6H)-one-2-carboxylic acid, and
Dimethyl 6-(4-chlorobenzyl)pyrazolo[1,5-c]quinazolin-5(6H)-one-1,2-dicarboxylate.

Examples of preferred Group B compounds include,
Pyrazolo[1,5-c]quinazolin-5(6H)-one-2-carboxylic acid,
2-(4-Chlorobenzoyl)pyrazolo[1,5-c]quinazolin-5(6H)-one,
2-(4-Methylbenzoyl)pyrazolo[1,5-c]quinazolin-5(6H)-one,
Dimethyl pyrazolo[1,5-c]quinazolin-5(6H)-one-1,2-dicarboxylate,
Ethyl 6-methylpyrazolo[1,5-c]quinazolin-5(6H)-one-2-carboxylate,
2-Benzoyl-6-methylpyrazolo[1,5-c]quinazolin-5(6H)-one,
2-(4Methoxybenzoyl)-6-methylpyrazolo[1,5-c]quinazolin-5(6H)-one,
Dimethyl 6-methylpyrazolo[1,5-c]quinazolin-5(6H)-one-1,2-dicarboxylate,
2-(4-Chlorobenzoyl)-6-phenylpyrazolo[1,5-c]quinazolin-5(6H)-one,
Ethyl 6-[3-(trifluoromethyl)phenyl]pyrazolo[1,5-c]quinazolin-5(6H)-one-2-carboxylate,
Ethyl 6-(4-chlorobenzyl)pyrazolo[1,5-c]quinazolin-5(6H)-one-2-carboxylate, and
Dimethyl 6-(4-chlorobenzyl)pyrazolo[1,5-c]quinazolin-5(6H)-one-1,2-dicarboxylate.

Examples of most preferred group B compounds include, among others,
Ethyl 6-[3-(trifluoromethyl)phenyl]pyrazolo[1,5-c]quinazolin-5(6H)-one-2-carboxylate, and
Ethyl 6-(4-chlorobenzyl)pyrazolo[1,5-c]quinazolin-5(6H)-one-2-carboxylate.

Group C compounds are all of the componds represented by the general formula when $R_2$ is carboxy or $C_1$–$C_3$ alkoxycarbonyl, $R_1$ does not include $C_1$–$C_3$ alkoxycarbonyl, and $R_3$ does not include hydrogen. Examples of Group C compounds include, among others,
6-Methylpyrazolo[1,5-c]quinazolin-5(6H)-one-2-carboxylic acid,
Ethyl 6-methylpyrazolo[1,5-c]quinazolin-5(6H)-one-2-carboxylate, Methyl 6-phenylppyrazolo[1,5-c]quinazolin-5(6H)-one-2-carboxylate,
Methyl 6-[3-(trifluoromethyl)phenyl]pyrazolo[1,5-c]quinazolin-5(6H)-one-2-carboxylate,
6-(4-chlorobenzyl)pyrazolo[1,5-c]quinazolin-5(6H)-one-2-carboxylic acid,
Ethyl 6-(4-chlorobenzyl)pyrazolo[1,5-c]quinazolin-5(6H)-one-2-carboxylate,
Ethyl 1-methyl-6-(4-chlorobenzyl)pyrazolo[1,5-c]quinazolin-5(6H)-one-2-carboxylate,
Ethyl 1-ethyl-6-(4-chlorobenzyl)pyrazolo[1,5-c]quinazolin-5(6H)-one-2-carboxylate,
Methyl 1-propyl-6-(4-chlorobenzyl)pyrazolo[1,5-c]quinazolin-5(6H)-one-2-carboxylate,
Ethyl 1-phenyl-6-(4-chlorobenzyl)pyrazolo[1,5-c]quinazolin-5-(6H)-one-2-carboxylate,
Ethyl 6-[3-(trifluoromethyl)benzyl]pyrazolo[1,5-c]quinazolin-5(6H)-one-2-carboxylate,
Ethyl 6-(4-chlorobenzyl)-7-methylpyrazolo[1,5-c]quinazolin-5(6H)-one-2-carboxylate,
Methyl 6-(4-chlorobenzyl)-9-methylpyrazolo[1,5-c]quinazolin-5(6H)-one-2-carboxylate,
Ethyl 6-(4-chlorobenzyl)-9-chloropyrazolo[1,5-c]quinazolin-5(6H)-one-2-carboxylate,
Ethyl 6-(4-chlorobenzyl)-9-bromopyrazolo[1,5-c]quinazolin-5(6H)-one-2-carboxylate,
Ethyl 6-(4-chlorobenzyl)-7-methyl-10-chloropyrazolo[1,5-c]quinazolin-5(6H)-one-2-carboxylate, and
Ethyl 6-(4-chlorobenzyl)-8-chloro-9-methoxypryazolo[1,5-c]quinazolin-5(6H)-one-2-carboxylate.

Examples of preferred Group C compounds include, among others,
Methyl 6-phenylpyrazolo[1,5-c]quinazolin-5(6H)-one-2-carboxylate,
Methyl 6-[3-(trifluoromethyl)phenyl]pyrazolo[1,5-c]quinazolin-5(6H)-one-2-carboxylate,
6-(4-Chlorobenzyl)pyrazolo[1,5-c]quinazolin-5(6H)-one-2-carboxylic acid, and
Ethyl 6-(4-chlorobenzyl)pyrazolo[1,5-c]quinazolin-5(6H)-one-2-carboxylate.

As indicated hereinbefore, the pyrazolo[1,5-c]quinazolin-5(6H)-ones of the present invention are prepared by the process which comprises reacting an activated acetylene with a 3-diazoindol-2(3H)-one.

In general, the above process of the present invention can be represented by the following reaction scheme:

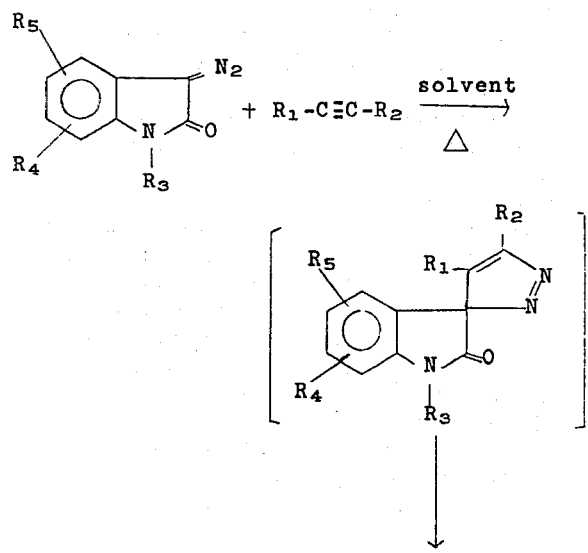

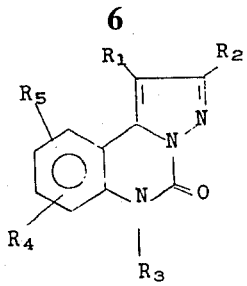

Reaction proceeds via the bracketed, relatively unstable intermediate, a 2-oxospiro[indoline-3,5'-pyrazole], which is not isolated. The reaction is carried out in a solvent which is inert to both of the reactants. Examples of suitable solvents include, among others, aliphatic hydrocarbons, such as pentane, hexane, octane, and the like; aromatic hydrocarbons, such as benzene, toluene, the xylenes, and the like; halogenated hydrocarbons, such as methylene chloride, chloroform, carbon tetrachloride, ethylene dichloride, chlorobenzene, bromobenzene, and the like; ethers, such as diethyl ether, diisopropyl ether, methyl butyl ether, tetrahydrofuran, 1,4-dioxane, and the like; aliphatic esters, such as methyl acetate, ethyl acetate, butyl acetate, and the like; and miscellaneous solvents, such as N,N-dimethylacetamide, dimethyl sulfoxide, and the like. The aromatic hydrocarbons are preferred, with benzene and toluene being most preferred. The amount of solvent employed is not critical, but should be sufficient to permit adequate agitation. Typically, the weight-to-volume ratio of reactants to solvent is at least about 1:2 and preferably at least about 1:3, although even larger volumes of solvent can be employed if desired. Normally, equimolar amounts of activated acetylene and 3-diazoindol-2(3H)-one are employed. However, the molar ratio of activated acetylene to 3-diazoindol-2(3H)-one can vary from about 1:1 to about 2:1. Preferably, the molar ratio will be in the range of from about 1:1 to about 1.1:1. Reaction time, while to some extent temperature-dependent, can vary from about 15 minutes to about 24 hour. Preferably, the reaction time will be in the range of from about 15 minutes to about 7 hours. The reaction normally is carried out at an elevated temperature, i.e., from about 40°C. to about 150°C., conveniently at the reflux temperature of the solvent if below about 150°C. A reaction temperature of from about 70°C. to about 120°C. is preferred. Isolation of the desired pyrazolo[1,5-c]quinazolin-5(6H)-one is accomplished by standard procedures. With the preferred solvents, the pyrazolo[1,5-c]quinazolin-5(6H)-one is relatively insoluble at ambient temperature or lower, and isolation of the reaction product is accomplished simply by cooling the reaction mixture and filtering. If desired, the pyrazolo[1,5-c]quinazolin-5(6H)-one can be recrystallized from additional reaction solvent.

In carrying out the above-described reaction, the activated acetylene preferably will not contain a carboxy group; i.e., $R_2$ preferably is not carboxy. An unprotected carboxy group can react with the diazo moiety of the 3-diazoindol-2(3H)-one to give an ester.

If it is desired to obtain a pyrazolo[1,5-c]quinazolin-5(6H)-one having a carboxylic acid group in the 2-position, it is preferred to react an activated acetylene in which $R_2$ is $C_1$–$C_3$ alkoxycarbonyl with the desired 3-diazoindol-2(3H)-one and hydrolyze by standard procedures the pyrazolo[1,5-c]quinazolin-5(6H)-one-2-carboxylate thus obtained to the free acid. Of course, care must be taken to avoid conditions which will cause ring opening to give the pyrazole-3-carboxylic acid as described hereinbelow.

It should be noted that the activated acetylene preferably reacts with the 3-diazoindol-2(3H)-one in such a manner as to give a pyrazolo[1,5-c]quinazolin-5(6H)-one having $R_1$ in the 1-position. However, reverse addition can occur which results in $R_2$ being in the 1-position. Normally, such reverse addition is not favored. In fact, when $R_1$ is hydrogen or $C_1$–$C_3$ alkoxycarbonyl, little if any reverse addition product is formed. In any event, whatever reverse addition compound is present is not detrimental to the isolation and purification of the desired product. However, when $R_1$ is $C_1$–$C_4$ alkyl, phenyl, or monosubstituted phenyl, reverse addition product is formed, with the amount reformed increasing with increasing bulk of $R_1$. Consequently, the formation of reverse addition compounds is of primary importance in the preparation of Group C compounds in which $R_2$ is carboxy or $C_1$–$C_3$ alkoxycarbonyl, since such preparation can result in a mixture of pyrazolo[1,5-c]quinazolin-5(6H)-one-1-and -2-carboxylic acids or esters thereof. Hydrolysis (as described hereinbelow) of such a mixture results in the formation of the desired pyrazole-3-carboxylic acid and a pyrazole-4-carboxylic acid which undergoes intramolecular condensation to give a 1H-pyrazolo[4,3-c]quinol-4(5H)-one having the following general formula:

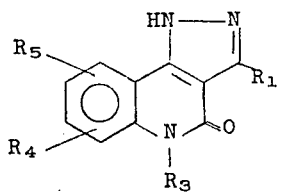

Fortunately, the desired pyrazole-3-carboxylic acid is readily separated from the 1H-pyrazolo[4,3-c]quinol-4(5H)-one by standard procedures well known to those skilled in the art.

The activated acetylenes employed in the process of the present invention in general are commercially available or readily prepared by well-known procedures. Examples of suitable activated acetylenes include, among others, methyl propiolate, ethyl propiolate, dimethyl acetylenedicarboxylate, diisopropyl acetylenedicarboxylate, ethyl phenylpropiolate, methyl 3-chlorophenylpropiolate, ethyl 4-ethoxyphenylpropiolate, methyl 2-butynoate, propyl 2-hexynoate, benzoylacetylene, 3-bromobenzoylacetylene, 4-ethylbenzoylacetylene, 3-butyn-2-one, and the like.

The 3-diazoindol-2(3H)-ones employed in the process of the present invention in general are prepared from the corresponding isatin compound. The preparation of isatin compounds is well known in the art. The required N-substituted isatin is obtained by either of two routes, depending upon whether the N-substitutent is (1) alkyl or aralkyl, or (2) aryl. When the desired isatin nitrogen substituent is alkyl or aralkyl, the isatin compound is prepared by N-alkylation of the parent compound with an alkyl or aralkyl halide in the presence of a strong base such as, for example, sodium hydride. However, when an aryl substituent on the isatin nitrogen is desired, a different procedure must be employed. In that case, the desired N-aryl isatin is prepared directly by cyclization with oxalyl chloride of an appropriately-substituted diarylamine.

Once the desired isatin has been obtained, the corresponding 3-diazoindol-2(3H)-one is prepared in accordance with known procedures. See, for example, J. M. Michowski, *Tetrahedron Letters*, 1773 (1967) and M. P. Cava, et al., *J. Am. Chem. Soc.*, 80, 2257 (1958). The appropriate isatin compound is treated with p-toluenesulfonylhydrazine. The resulting hydrazone then is treated with aluminum oxide to give the desired 3-diazoindol-2(3H)-one.

The Group C compounds prepared by the above-described process are converted by alkaline hydrolysis to the corresponding pyrazole-3-carboxylic acids which are useful as complement inhibitors. The hydrolysis reaction can be represented by the following reaction scheme which ilustrates the preparation of 5-[2-(4-chlorobenzylamino)phenyl]pyrazole-3-carboxylic acid from ethyl 6-(4-chlorobenzyl)pyrazolo[1,5-c]quinazolin-5(6H)-one-2-carboxylate:

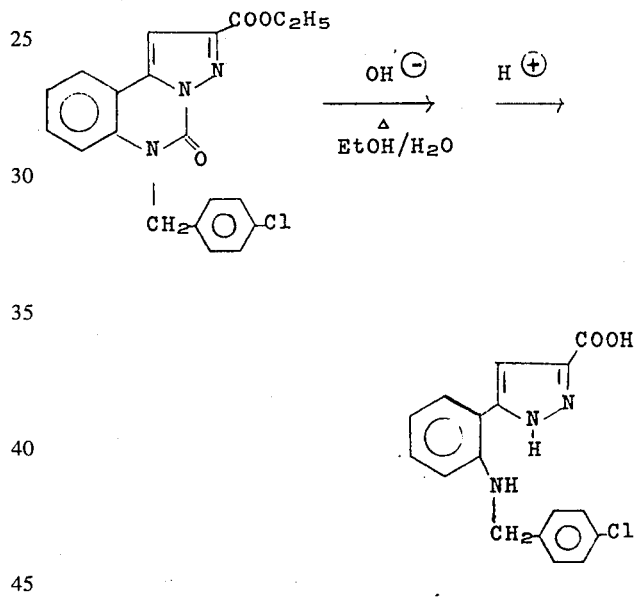

Typically, a mixture of the pyrazolo[1,5-c]quinazolin-5(6H)-one, potassium hydroxide, and aqueous ethanol is heated at reflux. The reaction mixture then is cooled and made acidic with aqueous hydrochloric acid. The solid which forms is isolated by filtration and purified by dissolving the material in hot ethanolic N,N-dimethylformamide and pouring the hot solution into water. The solid which precipitates is collected and, if desired, further purified.

The pyrazolo[1,5-c]quinazolin-5(6H)-ones of the present invention also can be prepared by a second process which comprises the steps of (1) reacting an activated acetylene with an isatin 3-hydrazone to obtain the corresponding 2-oxospiro[indoline-3,5'-[2]pyrazoline], and (2) oxidizing with 1,4-benzoquinone the 2-oxospiro[indoline-3,5'-[2]pyrazoline] to the corresponding 2-oxospiro[indoline-3,5'-pyrazole] which spontaneously rearranges to the pyrazolo[1,5-c]quinazolin-5(6H)-one, as illustrated by the following reaction scheme:

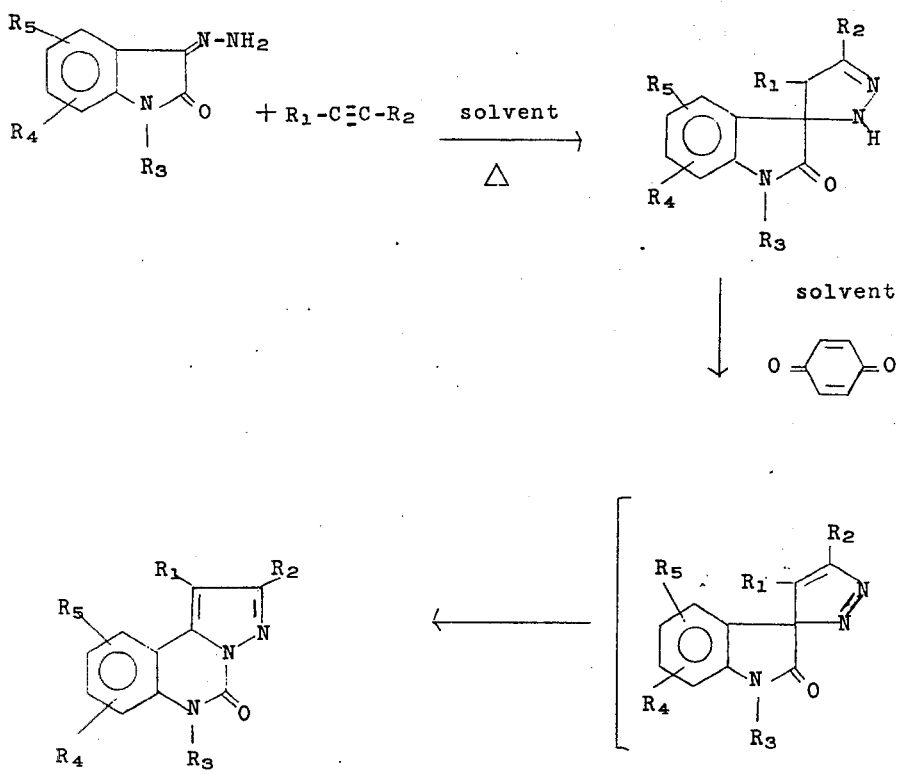

A mixture of the isatin hydrazone (prepared by known procedures from the corresponding isatin), activated acetylene, and inert solvent is heated. The reaction solution is cooled and concentrated; the residue is taken up in a suitable solvent or solvent mixture and cooled. The solid which forms is isolated by filtration and recrystallized. The resulting spiro compound is heated with 1,4-benzoquinone in a suitable solvent. Upon cooling, the solid formed, is isolated by filtration and recrystallized to give the pyrazolo[1,5-c]quinaozolin-5(6H)-one. In this procedure, it is preferred that $R_1$ and $R_2$ be the same. Most preferably, $R_1$ and $R_2$ will be methoxycarbonyl.

The reaction between the isatin hydrazone and the activated acetylene in general is carried out in an inert solvent, such as those listed hereinbefore as suitable for the reaction of an activated acetylene with a 3-diazoindol-2(3H)-one. Again, aromatic hydrocarbons are preferred, with toluene being most preferred. The amount of solvent employed, while not critical, should be sufficient to permit adequate agitation. Usually, the weight-to-volume ratio of reactants to solvent is at least about 1:2 and preferably about 1:3, although even greater volumes of solvent can be employed if desired. Normally, the activated acetylene and the isatin hydrazone are employed in equimolar amounts, although the molar ratio of activated acetylene to isatin hydrazone can vary from about 1:1 to about 1.1:1. Of course, an even larger excess of activated acetylene can be employed if desired. The reaction is carried out at a temperature of from about 40° to about 150°C. A reaction temperature of from about 70° to about 120°C. is preferred. The reaction time can vary from about 15 minutes to about 24 hours, although a reaction time of from about 1 to about 6 hours is preferred. Isolation of the 2-oxospiro[indoline-3,5'-[2]pyrazoline] is readily accomplished by standard procedures. For example, the product often can be precipitated by cooling the reaction solution. Alternatively, precipitation can be aided by adding a second solvent which is less polar than the reaction solvent, such as an aliphatic hydrocarbon. If necessary, the reaction solvent can be replaced with a less polar solvent, with or without the above-described addition of a second solvent.

In the oxidation of the spiro pyrazoline compound obtained as described above, the benzoquinone and spiro pyrazoline compound generally are employed in equimolar amounts, although up to a two-fold excess of benzoquinone can be employed if desired. The solvent employed generally is one in which both reactants are soluble. Examples of suitable solvents include $C_1$–$C_3$ alkanols, such as methanol, ethanol, propanol, and isopropanol; aliphatic ketones, such as acetone, methyl ethyl ketone, ethyl propyl ketone, methyl isobutyl ketone, and the like; aliphatic carboxylic acid esters, such as ethyl acetate and the like; and other like solvents. Ketones are the preferred solvents, with acetone being most preferred. The amount of solvent employed is not critical; the parameters discussed with respect to the solvent in the first step above apply here also. The reaction normally is carried out at an elevated temperature, i.e., from about 40° to about 120°C., with the reflux temperature of the solvent, if below about 120°C., being preferred. The reaction time can vary from about 30 minutes to about 24 hours, although a reaction time of from about 1 hour to about 6 hours usually is sufficient. Because the resulting pyrazolo [1,5-c]quinazolin-5(6H)-one usually is relatively insoluble in the more polar solvents, such as acetone, at relatively low temperatures, i.e., at ambient temperature or lower, the product normally need only be isolated by filtration upon cooling the reaction solution.

In the sections which follow, consideration of the activities and uses of the pyrazolo[1,5-c]quinazolin-5(6H)-ones of the present invention is given.

ANTI-INFLAMMATORY ACTIVITY

Anti-inflammatory activity is established by means of the carrageenin-induced edema test of C. A. Winter, et al., *Proc. Soc. Exp. Biol. Med.*, 111, 544 (1962).

Representative Group A pyrazolo[1,5-c]quinazolin-5(6H)-ones of the present invention were tested by means of the above-identified procedure. The results are summarized in Table I.

Table I

Percent Inhibition of Carrageenin-Induced Edema After Two Oral Doses of Test Compound

| Compound | Dose mg./kg. | Percent Inhibition |
|---|---|---|
| 2-Acetyl-6-methylpyrazolo-[1,5-c]quinazolin-5(6H)-one | 50 | 24 |
| Methyl 6-(4-chlorobenzyl)-pyrazolo[1,5-c]quinazolin-5(6H)-one-2-carboxylate | 50 | 29 |
| 2-(4-Chlorobenzoyl)pyrazolo-[1,5-c]quinazolin-5(6H)-one | 100 | 43 |
|  | 20 | 37 |

To utilize a Group A compound as an anti-inflammatory agent, such a compound is administered to a mammal in an effective amount, typically, a dose of from about 10 to about 150 mg./kg. of mammal body weight. The Group A compound in general can be administered orally, parenterally, or in the form of rectal suppositories.

The compound preferably is employed in combination with one or more adjuvants suited to the particular route of administration. Thus, in the case of oral administration, the compound is modified with pharmaceutical diluents or carriers, such as lactose, sucrose, starch powder, cellulose, talc, magnesium stearate, magnesium oxide, calcium sulfate, acacia powder, gelatin, sodium alginate, sodium benzoate, and stearic acid. The resulting composition can be formulated into tablets or enclosed in capsules for convenient administration. The compound also can be mixed with an appropriate liquid and administered as an elixir, suspension, or the like. In the case of parenteral administration, the compound to be used is conveniently formulated in saline to constitute an injectable liquid solution or suspension. Other adjuvants and modes of administration are known to those skilled in the art. If desired, the pharmaceutical composition can contain, in addition to the Group A compound, one or more other pharmacologicallyactive substances, such as acetylsalicylic acid, α-d-propoxyphene, caffeine, and acetaminophen (N-acetyl-p-aminophenol).

IMMUNOSUPPRESSANT ACTIVITY

As stated hereinabove, some of the Group A pyrazolo[1,5-c]quinazolin-5(6H)-ones are immunosuppressants. The ability of a Group A compound to suppress immune mechanisms in a host mammal is measured by the compound's activity as an anti-allergic agent by means of the following test. Groups of five 20-g. male Swiss mice are injected intraperitoneally with 0.2 ml. of a standardized antigen suspension (i.e., a suspension comprising washed sheep red blood cells, providing approximately $5 \times 10^7$ cells per mouse). Forty-eight hours before and 48 hours after the antigen suspension injections, test compounds are administered intraperitoneally in various doses to various animal groups. Seven days after the anatigen suspension injections, the mice are bled by cardiac puncture and the sera from each five-mouse group are pooled. Antibody determinations are made on the serum pools by a hemagglutination pattern procedure in which serial two-fold serum dilutions are mixed with equal volumes of a one percent sheep red blood cell suspension, incubated at 37°C. for four hours, and assessed for hemagglutinin content. Comparisons between serum pools from treated and control mouse groups are made and reported as percent suppression of hemagglutinin in treated groups. The results obtained upon testing representative Group A compounds are summarized in Table II.

Table II

Percent Suppression of Hemagglutinin

| Compound | Dose mg./kg. | % Suppression |
|---|---|---|
| 2-(4-Chlorobenzoyl)pyrazolo-[1,5-c]quinazolin-5(6H)-one | 50 | 75 |
| 2-(4-Chlorobenzoyl)-6-methylpyrazolo[1,5-c]quinazolin-5(6H)-one | 12.5 | 94 |
| 2-(4-Fluorobenzoyl)-6-methylpyrazolo-[1,5-c]quinazolin-5(6H)-one | 100 | 94 |
| 2-(4-Chlorobenzoyl)-6-(4-chlorobenzyl)-pyrazolo[1,5-c]quinazolin-5(6H)-one | 12.5 | 94 |
| Dimethyl 6-(4-chlorobenzoyl)pyrazolo[1,5-c]quinazolin-5(6H)-one-1,2-carboxylate | 200 | 94 |

Thus, certain of the Group A compounds are useful in suppressing the immune reaction in mammals, including the suppression of immune response engendered in response to the presence of foreign protein. The practical application of a prominent application of immunosuppressants is in organ transplants. However, immunosuppressants also can be employed advantageously in the therapy of the various diseases known collectively as autoimmune diseases. Although the etiology of these diseases is little understood, it generally is believed that an autoimmune reaction is involved. Examples of such diseases include autoimmune hemolytic anemia, idiopathic thrombocytopenic purpura, lupus erythematosus, lupoid hepatitis, lupus nephritis, glomerulonephritis, and nephrotic syndrome, Goodpasture's syndrome, Wegener's granulomatosis, schleroderma, Sezary's disease, psoriasis, uveitis, rheumatoid arthritis, ulcerative colitis, thyroiditis, and mumps orchitis.

Utilization of an immunosuppressing Group A compound in general involves parenteral administration to a mammal of an effective amount of such a compound, typically, a dose of from about 0.5 to about 400 mg/kg. of mammal body weight. The group A compound is preferably formulated as an injectable solution or suspension with a physiological saline solution. Methods for preparing such an injectable solution or suspension and the techniques for the parenteral administration of same are well known to those skilled in the art.

COMPLEMENT INHIBITION ACTIVITY

Complment inhibition activity is determined by the test procedure of W. T. Jackson, et al., reported at the 1971 Annual Meeting of the Federation of American Societies of Experimental Biology and abstracted in *Federation Proceedings*, Vol. 30, No. 2 (March–April), 1971.

The procedure measures inhibition of the functioning of the late components in immune hemolysis since inhibition of the early components might unfavorably alter susceptibility to infection. To carry out the test, sheep erythrocytes (E) are reacted with rabbit hemolysin (A) to form sensitized cells (EA). The EA cells then are incubated with iodine-oxidized, zymosantreated human serum to form $\overline{EAC1, 4\ oxy\ 2}$ cells. These latter cells then are lyzed with EDTA-human serum to which a buffer solution containing the test compound has been added. Lysis results in hemoglobin release which is measured colorimetrically after removing unlysed cells by centrifugation. As a control, the procedure is repeated, except that the test compound is omitted. The difference between the extent of hemoglobin release obtained in the control and the extent of hemoglobin release obtained in the presence of the test compound provides a measure of complement inhibition activity, expressed as percent inhibition of lysis. Thus, in any given series of test compounds, increasing activity results in increasing percent inhibition of lysis values. With each test compound, a control is conducted to correct the percent inhibition of lysis value obtained for compound-induced lysis. Such a control is carried out by adding to the $\overline{EAC1\ 4\ oxy\ 2}$ cells buffer solution containing the test compound. The extent of hemoglobin release is measured colorimetrically as described above. Such hemoglobin release is compared with the extent of hemoglobin release obtained from 100 percent cell lysis which results upon adding water to the cells. As before, the difference between the two hemoglobin release values provides a measure of compound-induced lysis, expressed as percent compound-induced lysis. The extent of compound-induced lysis is important for two reasons. First extensive compound-induced lysis adversely affects the accuracy and reliability of the test resuts. Second, and more important, compound-induced lysis partly or entirely counteracts any activity a compound might have in inhibiting immune hemolysis.

Representative Group B pyrazolo[1,5-c]quinazolin-5(6H)-ones were tested by means of the above-described procedure, with the results being summarized in Table III. Representative Group C compounds were hydrolyzed as described hereinabove and the resulting pyrazole-3-carboxylic acids were tested for complement inhibition activity by means of the above-described procedure, with the results being described in Table IV.

Table III

Percent Inhibition of Lysis
Obtained with Group B Compounds

| $R_1$ | $R_2$ | $R_3$ | Conc., μg./ml.ᵃ | Percent Inhibition |
|---|---|---|---|---|
| H | —COOH | H | 400 | 46 |
| H | —C(O)—C₆H₄—Cl | H | 267E | 28 |
| H | —C(O)—C₆H₄—CH₃ | H | 267E | 22 |
| —COOCH₃ | —COOCH₃ | H | 133E | 15 |
| H | —COOC₂H₅ | —CH₃ | 267E | 25 |
| H | —C(O)—C₆H₅ | —CH₃ | 267E | 22 |
| H | —C(O)—C₆H₄—Cl | —CH₃ | 133E | 25 |
| H | —C(O)—C₆H₄—OCH₃ | —CH₃ | 133E | 17 |
| —COOCH₃ | —COOCH₃ | —CH₃ | 267E | 18 |
| H | —C(O)—C₆H₄—OCH₃ | —C₆H₅ | 133E | 20 |
| H | —COOC₂H₅ | —C₆H₄—CF₃ | 133E | 61 |

Table III—Continued

Percent Inhibition of Lysis
Obtained with Group B Compounds

| $R_1$ | $R_2$ | $R_3$ | Conc., µg./ml.[a] | Percent Inhibition |
|---|---|---|---|---|
| H | —COOC$_2$H$_5$ | —CH$_2$—⌬—Cl | 40E | 62 |
| —COOCH$_3$ | —COOCH$_3$ | —CH$_2$—⌬—Cl | 267E | 28 |

[a]Concentration of test compound expressed as µg. compound per ml. total test volume. Many compounds were not soluble at the usual test concentration of 400 µg./ml. In such cases the suspension obtained was filtered and the supernatant liquid tested. The concentration of the compound was estimated and is so indicated by an "E" adjacent to the estimated value.

Table IV

Percent Inhibition of Lysis Obtained
With Pyrazole-3-Carboxylic Acids Prepared
by Hydrolysis of Group C Compounds

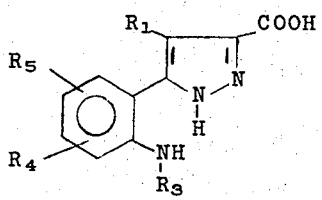

| $R_4$ | $R_5$ | $R_1$ | $R_3$ | Conc., µg./ml.[a] | Percent Inhibition |
|---|---|---|---|---|---|
| H | H | H | —CH$_3$ | 400 | 51[b] |
| H | H | H | —⌬ | 400 | 100[c] |
|  |  |  |  | 40 | 82 |
|  |  |  |  | 30 | 72 |
|  |  |  |  | 20 | 57 |
|  |  |  |  | 15 | 54 |
|  |  |  |  | 10 | 42 |
|  |  |  |  | 5 | 27 |
| H | H | H | —⌬—CF$_3$ | 360E | Unknown[d] |
|  |  |  |  | 36E | 92 |
| H | H | H | —CH$_2$—⌬—Cl | 400 | Unknown[d] |
|  |  |  |  | 40 | 90 |
|  |  |  |  | 30 | 87 |
|  |  |  |  | 20 | 78 |
|  |  |  |  | 15 | 68 |
|  |  |  |  | 10 | 47 |
|  |  |  |  | 5 | 36 |
| H | H | —CH$_3$ | —CH$_2$—⌬—Cl | 360E | Unknown[d] |
|  |  |  |  | 36E | 85[e] |
| H | H | —C$_2$H$_5$ | —CH$_2$—⌬—Cl | 27E | 74 |
| H | H | —C$_3$H$_7$ | —CH$_2$—⌬—Cl | 360E | Unknown[d] |
|  |  |  |  | 40 | 59[d] |
| H | H | —⌬ | —CH$_2$—⌬—Cl | 40 | 64 |
| 7—CH$_3$ | H | H | —CH$_2$—⌬—Cl | 400 | Unknown[d] |
|  |  |  |  | 40 | 11.5 |
| H | 9—CH$_3$ | H | —CH$_2$—⌬—Cl | 360E | Unknown[d] |
|  |  |  |  | 36E | 31[a] |
| H | 9—Cl | H | —CH$_2$—⌬—Cl | 40 | Unknown[d] |
|  |  |  |  | 20 | 47[h] |
| 7—CH$_3$ | 10—Cl | H | —CH$_2$—⌬—Cl | 360E | 19 |

Table IV — Continued

Percent Inhibition of Lysis Obtained
With Pyrazole-3-Carboxylic Acids Prepared
by Hydrolysis of Group C Compounds

| $R_4$ | $R_5$ | $R_1$ | $R_3$ | Conc., $\mu g./ml.^a$ | Percent Inhibition |
|---|---|---|---|---|---|
| 8—Cl | 9—OCH$_3$ | H |  | 360E | Unknown$^d$ |
|  |  |  |  | 40 | 65$^b$ |

$^a$Concentration of test compound expressed as μg. compound per ml. total test volume. Many compounds were not soluble at the usual test concentration of 400 μg./ml. IN such cases, the suspension obtained was filtered and the supernatant liquid tested. The concentration of the compound was estimated and is so indicated by an "E" adjacent to the estimated value. Dilutions of this original supernatant liquid to give less concentrated solutions for testing necessarily resulted in solutions having an estimated concentration of test compound.
$^b$1.66 percent compound-induced lysis.
$^c$1.7 percent compound-induced lysis.
$^d$Essentially complete compound-induced lysis.
$^e$0.5 percent compound-induced lysis.
$^f$0.85 percent compound-induced lysis.
$^g$1.25 percent compound-induced lysis.
$^h$0.82 percent compound-induced lysis.

It is seen that Group B compounds or pyrazole-3-carboxylic acids obtained from the hydrolysis of Group C compounds are useful in inhibiting complement-induced hemolysis. Consequently, complement inhibitors find practical utility in the treatment of such diseases as glomerulonephritis, serum sickness, and certain inflammatory diseases such as rheumatoid arthritis.

Utilization of a complement inhibitor in general involves administering to a mammal parenterally, preferably intravenously or intraperitoneally, an effective amount of such a compound, typically at a dosage level sufficient to provide a concentration of the compound in the blood of from about 1 to about 400 μg./ml. Such a concentration on the average is approximately equivalent to a dose of from about 0.05 to about 32 mg./kg. The necessary concentration in the blood of complement inhibitor can be achieved by administering a single dose or up to about six smaller doses per day, depending upon the tolerance of the patient to the compound, persistence of the compound in the blood stream, and other factors. Following procedures well known to those skilled in the art, the complement inhibitor normally is formulated into a pharmaceutical composition comprising the active ingredient in association with at least one pharmaceutically-acceptable carrier therefor. Such a composition generally is prepared by incorporating the complement inhibitor in a liquid solution or suspension, except that a suspension is not employed for intravenous administration. In such a composition, the complement inhibitor ordinarily will be present in an amount of at least about 0.0001 and not more than about 50 percent by weight, based on the total weight of the composition.

Suitable pharmaceutical carriers are described in E. W. Martin, et al., "Remington's Pharmaceutical Sciences," 14th Ed., Mack Publishing Company, Easton, Pa., 1965.

In addition to parenteral administration, the complement inhibitor can be administered to a mammal enterally, preferably orally. For enteral administration, the complement inhibitor normally is formulated into a pharmaceutical composition comprising the active ingredient in association with at least one pharmaceutically-acceptable carrier therefor. For enteral administration, the complement inhibitor normally is administered at a level of from about 1 to about 200 mg./kg. of mammal body weight. Advantageously, the complement inhibitor is formulated in a dosage unit form containing from about 5 to about 500 mg., preferably from about 10 to about 150 mg., of active ingredient (complement inhibitor). Examples of suitable dosage unit forms are tablets, hard or soft gelatin capsules, micro-capsules, and suppositories, as well as drug-dispensing systems comprising the active ingredient contained in a flexible, imperforate polymeric material through which the drug is released slowly by diffusion. More generally, the term "dosage unit form" as used herein means a physically-discrete unit containing the active ingredient, generally in admixture with and/or enclosed by a pharmaceutical carrier, the quantity of active ingredient being such that one or more units normally are required for a single administration.

The present invention is more fully described, without intending to limit it in any manner, by the following examples which illustrate the preparation of certain pyrazolo[1,5-c]-quinazolin-5(6H)-ones of the present invention and the hydrolysis of a Group C compound to give a complement inhibiting pyrazole-3-carboxylic acid. In the examples, all temperatures are in degrees centigrade, unless specified otherwise.

EXAMPLE 1

Preparation of 2-(4-chlorobenzoyl)pyrazolo[1,5-c]quinazolin-5(6H)-one.

A solution of 8.0 g. of 3-diazoindol-2(3H)-one and 8.25 g. of 4-chlorobenzoylacetylene in 100 ml. of benzene was heated at reflux for 30 minutes, during which time a solid precipitated. The mixture was cooled and maintained at about 5° overnight. The mixture was filtered and the solid was successively washed with benzene and diethyl ether. The yield of crude product was 13.5 g. (84 percent). The solid was recrystallized from N,N-dimethylformamide/ethanol to give 2-(4-chlorobenzoyl)pyrazolo[1,5-c]quinazolin-5(6H)-one, m.p. 328°–333°. The assigned structure was confirmed by ultraviolet, infrared, and nuclear magnetic resonance analyses. The following elemental analysis was obtained:

Calculated for $C_{17}H_{10}ClN_3O_2$: C, 63.06; H, 3.11; N, 12.98; Cl, 10.95. Found: C, 62.90; H, 3.33; N, 13.19; Cl, 10.90.

EXAMPLES 2–9

The following compounds were prepared according to the procedure of Example 1, using the indicated reactants and amounts thereof; differences from the Example 1 procedure are noted. The elemental analysis of each compound also is given.

2-Acetyl-6-methylpyrazolo[1,5-c]quinazolin-5(6H)-one, m.p. 243°–247°. From 5.9 g. of 1-methyl-3-diazoindol-2(3H)-one and 4.6 g. of 3-butyne-2-one in 100 ml. of benzene. Reflux time, 4 hours. Yield of crude product, 6.4 g. (78 percent). Product not recrystallized.

Calculated for $C_{13}H_{11}N_3O_2$: C, 64.72; H, 4.60; N, 17.42. Found: C, 64.83; H, 4.43; N, 17.70.

2-(4-Chlorobenzoyl)-6-methylpyrazolo[1,5-c]quinazolin-5-(6H)-one, m.p. 244°–246°. From 1.73 g. of 1-methyl-3-diazoindole-2(3H)-one and 1.7 g. of 4-chlorobenzoylacetylene in 20 ml. of benzene. Yield of recrystallized (chloroform/methanol) product, 1.5 g. (44 percent).

Calculated for $C_{18}H_{12}ClN_3O_2$: C, 63.86; H, 3.81; N, 12.41; Cl, 10.47. Found: C, 63.83; H, 3.63; N, 12.36; Cl, 10.76.

2-(4-Fluorobenzoyl)-6-methylpyrazolo[1,5-c]quiazolin-5(6H)-one, m.p. 214°–216°. From 5.2 g. of 1-methyl-3-diazoindol-2(3H)-one and 4.6 g. of 4-fluorobenzoylacetylene in 50 ml. of benzene. Yield of crude product, 4.5 g. (47 percent); yield of recrystallized (chloroform/methanol) product, 3.0 g.

Calculated for $C_{18}H_{12}FN_3O_2$: C, 67.12; H, 4.01; N, 13.04. Found: C, 67.52; H, 3.90; N, 13.24.

Dimethyl 6-methylpyrazolo[1,5-c]quinazolin-5(6H)-one-1,2-dicarboxylate, m.p. 174°–177°. From 1.75 g. of 1-methyl-3-diazoindol-2(3H)-one and 1.7 g. of dimethyl acetylenedicarboxylate in 50 ml. of benzene. Reflux time, 7 hours. Yield of crude product, 2.9 g. (92 percent); yield of recrystallized (acetone) product, 2.45 g.

Calculated for $C_{15}H_{13}N_3O_5$: C, 57.30; H, 4.16; N, 13.33. Found: C, 57.30; H, 4.24; N, 13.27.

Methyl 6-(4-chlorobenzyl)pyrazolo[1,5-c]quinazolin-5(6H)-one-2-carboxylate, m.p. 187°–190°. From 8.5 g. of 1-(4-chlorobenzyl)-3-diazoindol-2(3H)-one and 5.0 g. of methyl propiolate in 150 ml. of benzene. Reflux time, 10 hours. Yield of crude product, 9.8 g. (89 percent). Product recrystallized from benzene.

Calculated for $C_{19}H_{14}ClN_3O_2$: C, 62.05; H, 3.84; N, 11.42. Found: C, 62.28; H, 4.08; N, 11.57.

Ethyl 6-(4-chlorobenzyl)pyrazolo[1,5-c]quinazolin-5(6H)-one-2-carboxylate, m.p. 196°–197°. From 20.3 g. of 1-(4-chlorobenzyl)-3-diazoindol-2(3H)-one and 16.1 g. of ethyl propiolate in 150 ml. of benzene. Reflux time, 24 hours. Yield of crude product, 19.3 g. (70 percent). Product not recrystallized.

Calculated for $C_{20}H_{16}ClN_3O_3$: C, 62.91; H, 4.22; N, 11.01. Found: C, 63.04; H, 4.00; N, 11.20.

2-(4-Chlorobenzoyl)-6-(4-chlorobenzyl)pyrazolo[1,5-c]-quinazolin-5(6H)-one, m.p. 248°–251°. From 1.5 g. of 1-(4-chlorobenzyl)-3-diazoindol-2(3H)-one and 0.87 g. of 4-chlorobenzoylacetylene in 15 ml. of benzene. Yield of recrystallized (chloroform/methanol) product, 0.9 g. (38 percent).

Calculated for $C_{24}H_{15}Cl_2N_3O_2$: C, 64.29; H, 3.37; N, 9.37; Cl, 15.81. Found: C, 64.38; H, 3.04; N, 9.60; Cl, 16.00.

Dimethyl 6-(4-chlorobenzyl)pyrazolo[1,5-c]quinazolin-5(6H)-one-1,2-dicarboxylate, m.p. 242°–245°. From 10.1 g. of 1-(4-chlorobenzyl)-3-diazoindol-2(3H)-one and 6.4 g. of dimethyl acetylenedicarboxylate in 300 ml. of benzene. Reflux time, 1.5 hours. Yield of crude product, 11.8 g. (77 percent). Product not recrystallized.

Calculated for $C_{21}H_{16}ClN_3O_5$: C, 59.22; H, 3.78; N, 9.86; Cl, 8.32. Found: C, 59.31; H, 3.62; N, 9.78; Cl, 8.42.

EXAMPLE 10

Preparation of dimethyl 6-(4-chlorobenzyl)pyrazolo[1,5-c]quinazolin-5(6H)-one-1,2-dicarboxylate.

A. Preparation of dimethyl 1-(4-chlorobenzyl)-2-oxo-spiro[indoline-3,5'-[2]pyrazoline]-3',4'-dicarboxylate.

A mixture of 28 g. of 1-(4-chlorobenzyl)isatin 3-hydrazone, 15.5 g. of dimethyl acetylenedicarboxylate, and 100 ml. of toluene was heated at reflux for 3 hours. The reaction solution was distilled under reduced pressure. The residual oil was diluted with benzene and hexane and maintained at about 5° overnight. The solid (21.5 g.) that formed was isolated by filtration and recrystallized twice from benzene/hexane and once from methanol to give the desired spiro compound, m.p. 163°–166° (dec.). The following elemental analysis was obtained:

Calculated for $C_{21}H_{18}ClN_3O_5$: C, 58.95; H, 4.24; N, 9.82; Cl, 8.28. Found: C, 59.14; H, 4.49; N, 10.00; Cl, 8.62.

The assigned structure also was consistent with nuclear magnetic resonance analysis.

B. Preparation of dimethyl 6-(4-chlorobenzyl)pyrazolo[1,5-c]quinazolin-5(6H)-one-1,2-dicarboxylate.

A solution of 1 g. of the above spiro compound and 0.25 g. of 1,4-benzoquinone in 20 ml. of acetone was heated at reflux for 2 hours. The reaction solution was allowed to cool, resulting in the separation of a solid. The solid was isolated by filtration, giving 0.20 g. of crude dimethyl 6-(4-chlorobenzyl)pyrazolo[1,5-c]quinazolin-5(6H)-one-1,2-dicarboxylate, m.p. 239°–244°. The material was recrystallized from acetone; m.p. 241.5°–243°. The following elemental analysis was obtained:

Calculated for $C_{21}H_{16}ClN_3O_5$: C, 59.22; H, 3.78; N, 9.86; Cl, 8.32. Found: C, 59.31; H, 3.62; N, 9.78; Cl, 8.42.

The assigned structure was consistent with nuclear magnetic resonance analysis.

EXAMPLE 11

Preparation of 5-[2-(4-chlorobenzylamino)phenyl]pyrazole-3-carboxylic acid.

A mixture of 40 g. of ethyl 6-(4-chlorobenzyl)pyrazolo[1,5-c]quinazolin-5(6H)-one-2-carboxylate (Example 7), 500 ml. of 20 percent aqueous potassium hydroxide, and 500 ml. of methanol was heated at reflux for 1 hour. The reaction solution was cooled and distilled under reduced pressure until the volume of the remaining solution was about 500 ml. The solution then was made acidic with concentrated hydrochloric acid. About 40 g. of solid precipitated and was isolated by filtration. About 25 g. of the solid was dissolved in a large quantity of N,N-dimethylformamide. The resulting mixture was filtered and the filtrate was heated on a steam bath for 24 hours. The solution was distilled until the remaining volume was about 50 ml. The residue was cooled and diluted with water until turbidity persisted. The mixture was cooled at about 5°. The solid which resulted was isolated by filtration. The solid, 11.3 g., m.p. 122°–131°, was recrystallized twice to give 5.2 g. of 5-[2-(4-chlorobenzylamino)phenyl]pyrazole-3-carboxylic acid, m.p. 135°–139°. The assigned structure was consistent with ultraviolet and nuclear magnetic resonance analyses. The following elemental analysis was obtained:

Calculated for $C_{17}H_{14}ClN_3O_2$: C, 62.30; H, 4.30; N, 12.82. Found: C, 62.50; H, 4.47; N, 12.63.

What is claimed is:

1. A pyrazolo[1,5-c]quinazolin-5(6H)-one of the formula

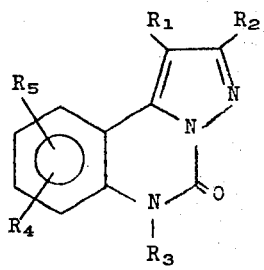

wherein $R_1$ is a monovalent group selected from the group consisting of hydrogen, $C_1$–$C_4$ alkyl, $C_1$–$C_3$ alkoxycarbonyl, phenyl, and monosubstituted phenyl in which the substituent is fluoro, chloro, bromo, $C_1$–$C_3$ alkyl, or $C_1$–$C_3$ alkoxy; $R_2$ is a monovalent group selected from the group consisting of carboxy, $C_1$–$C_3$ alkoxycarbonyl, acetyl, benzoyl, and monosubstituted benzoyl in which the substituent is fluoro, chloro, bromo, $C_1$–$C_3$ alkyl, or $C_1$–$C_3$ alkoxy; $R_3$ is a monovalent group selected from the group consisting of hydrogen, methyl, benzyl, phenyl, and monosubstituted benzyl and phenyl in which the substituent is methyl, trifluoromethyl, methoxy, fluoro, chloro, bromo, or methylsulfonyl; and $R_4$ and $R_5$ are monovalent groups independently selected from the group consisting of hydrogen, methyl, methoxy, fluoro, chloro, and bromo, with the limitation that $R_4$ and $R_5$ must be different unless each of $R_4$ and $R_5$ is hydrogen.

2. The compound of claim 1, wherein $R_1$ is hydrogen or $C_1$–$C_3$ alkoxycarbonyl; $R_2$ is $C_1$–$C_3$ alkoxycarbonyl, acetyl, benzoyl, or monosubstituted benzoyl in which the substituent is fluoro, chloro, bromo, $C_1$–$C_3$ alkyl, or $C_1$–$C_3$ alkoxy; and $R_3$ is hydrogen, methyl, benzyl, or monosubstituted benzyl in which the substituent is fluoro, chloro, or bromo; with the limitation that when $R_1$ is hydrogen and $R_2$ is $C_1$–$C_3$ alkoxycarbonyl, $R_3$ cannot be methyl.

3. The compound of claim 2, which compound is 2-(4-chlorobenzoyl)pyrazolo[1,5-c]quinazolin-5(6H)-one.

4. The compound of claim 2, which compound is 2-acetyl-6-methylpyrazolo[1,5-c]quinazolin-5(6H)-one.

5. The compound of claim 2, which compound is methyl 6-(4-chlorobenzyl)pyrazolo[1,5-c]quinazolin-5(6H)-one-2-carboxylate.

6. A compound of claim 1, wherein $R_1$ is hydrogen or $C_1$–$C_3$ alkoxycarbonyl; and $R_2$ is carboxy, $C_1$–$C_3$ alkoxycarbonyl, benzoyl, or monosubstituted benzoyl in which the substituent is fluoro, chloro, bromo, $C_1$–$C_3$ alkyl, or $C_1$–$C_3$ alkoxy.

7. The compound of claim 6, which compound is 2-(4-chlorobenzoyl)-6-methylpyrazolo[1,5-c]quinazolin-5(6H)-one.

8. The compound of claim 6, which compound is 2-(4-chlorobenzoyl)-6-(4-chlorobenzyl)pyrazolo[1,5-c]quinazolin-5(6H)-one.

9. A compound of claim 1, wherein $R_1$ is $C_1$–$C_4$ alkyl, phenyl, or monosubstituted phenyl in which the substituent is $C_1$–$C_3$ alkyl, $C_1$–$C_3$ alkoxy, fluoro, chloro, or bromo; $R_2$ is carboxy or $C_1$–$C_3$ alkoxycarbonyl; and $R_3$ is methyl, phenyl, benzyl, or monosubstituted phenyl or benzyl in which the substituent is methyl, trifluoromethyl, methoxy, fluoro, chloro, bromo, or methylsulfonyl.

10. The compound of claim 9, which compound is 6-(4-chlorobenzyl)pyrazolo[1,5-c]quinazolin-5(6H)-one-2-carboxylic acid.

11. The compound of claim 9, which compound is 6-phenylpyrazolo[1,5-c]quinazolin-5(6H)-one-2-carboxylic acid.

12. The compound of claim 9, which compound is 6-[3-(trifluoromethyl)phenyl]pyrazolo[1,5-c]quinazolin-5(6H)-one-3-carboxylic acid.

* * * * *

UNITED STATES PATENT AND TRADEMARK OFFICE
CERTIFICATE OF CORRECTION

PATENT NO. : 3,897,434
DATED : July 29, 1975
INVENTOR(S) : Allen S. Katner

It is certified that error appears in the above-identified patent and that said Letters Patent are hereby corrected as shown below:

Column 4, line 1, retype the line (portions of which are illegible) as follows: --Pyrazolo[1,5-c]quinazolin-5(6H)-one-2-carboxylic--; line 17, "chlorobenzoyl" should read --Chlorobenzoyl--; line 28, retype the notation enclosed by brackets (a portion of which is illegible) as follows: --[1,5-c]--; line 30, retype the phrase enclosed by parenthesis (a portion of which is illegible) as follows: --(4-Chlorobenzoyl)--, but will apply to the Grant only.

Column 5, line 1, delete the second "p" in "phenylppyrazolo"; line 5, "chlorobenzyl" should read --Chlorobenzyl--.

Column 7, line 14, "$C_1-c_4$" should read -- $C_1-C_4$ --.

In columns 9 and 10, the right-hand formula should appear as shown on the attached sheet.

In column 11, in Table I, in the column identified by the term "Compound", in the fifth line thereof, "one-2-carboxvlate" should read -- one-2-carboxylate --; line 5Q "macologicallyactive" should read --macologically-active--.

Column 12, lines 1-3, retype lines 1-3 (portions of which are illegible) as follows: --groups. Seven days after the antigen suspension injections, the mice are bled by cardiac puncture and the sera from each five-mouse group are pooled. Antibody --; in Table II retype the heading thereof (portions of which are illegible) as follows: --Percent Suppression of Hemagglutinin--; line 35, delete the phrase "a prominent application of" and insert the phrase --immunosuppressant activity is varied. As noted hereinbefore, a prominent application of--; but will apply to the Grant only. about line 55, "group" should read -- Group --.

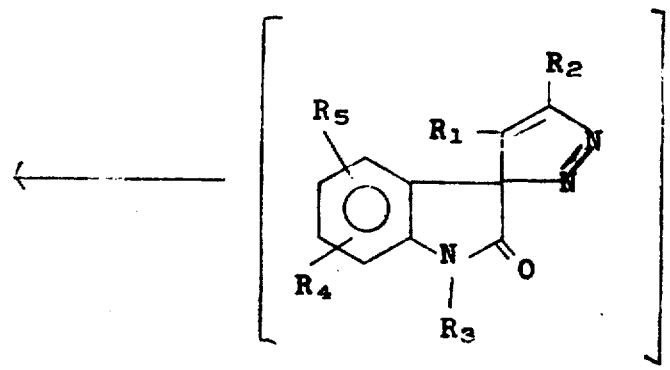

UNITED STATES PATENT AND TRADEMARK OFFICE
CERTIFICATE OF CORRECTION

PATENT NO. : 3,897,434
DATED : July 29, 1975
INVENTOR(S) : Allen S. Katner

It is certified that error appears in the above-identified patent and that said Letters Patent are hereby corrected as shown below:

Column 14, line 12, "resuts" should read --results--; in Table III, in the column labeled "$R_2$" and the next to last structural formula therein, "-$OCH_3$" should read -- -Cl --; in Table III, in the column labeled "$R_3$" and the last structural formula therein, "$CE_3$" should read --$CF_3$--.

Table IV should appear as shown on the attached sheet, but will apply to the Grant only.

Column 18, line 38, "[1,5-c]-quinazolin" should read --[1,5-c]quinazolin--.

Table IV
Percent Inhibition of Lysis Obtained With Pyrazole-3-Carboxylic Acids Prepared by Hydrolysis of Group C Compounds
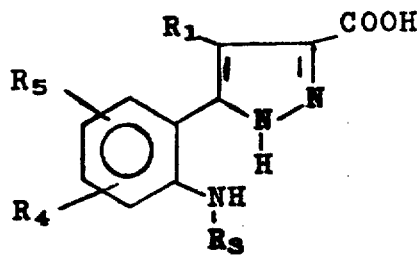
| $R_4$ | $R_5$ | $R_1$ | $R_3$ | Conc., μg/ml.[a] | Percent Inhibition |
|---|---|---|---|---|---|
| H | H | H | -CH₃ | 400 | 51[b] |
| H | H | H | –⟨phenyl⟩ | 400 | 100[c] |
|   |   |   |   | 40 | 82 |
|   |   |   |   | 30 | 72 |
|   |   |   |   | 20 | 57 |
|   |   |   |   | 15 | 54 |
|   |   |   |   | 10 | 42 |
|   |   |   |   | 5 | 27 |
| H | H | H | –⟨phenyl-CF₃⟩ | 360B | Unknown[d] |
|   |   |   |   | 36E | 92 |
| H | H | H | -CH₂–⟨phenyl⟩-Cl | 400 | Unknown[d] |
|   |   |   |   | 40 | 90 |
|   |   |   |   | 30 | 87 |

Table IV (cont.)

| R₄ | R₅ | R₁ | R₃ | Conc., μg./ml.[a] | Percent Inhibition |
|---|---|---|---|---|---|
| | | | | 20 | 78 |
| | | | | 15 | 68 |
| | | | | 10 | 47 |
| | | | | 5 | 36 |
| H | H | $-CH_3$ | $-CH_2-\phi-Cl$ | 360E | Unknown[d] |
| | | | | 36E | 85[e] |
| H | H | $-C_2H_5$ | $-CH_2-\phi-Cl$ | 27E | 74 |
| H | H | $-C_3H_7$ | $-CH_2-\phi-Cl$ | 360E | Unknown[d] |
| | | | | 40 | 59[d] |
| H | H | $-\phi$ [c] | $-CH_2-\phi-Cl$ | 40 | 64 |
| 7-$CH_3$ | H | H | $-CH_2-\phi-Cl$ | 400 | Unknown[d] |
| | | | | 40 | 11.5 |
| H | 9-$CH_3$ | H | $-CH_2-\phi-Cl$ | 360E | Unknown[d] |
| | | | | 36E | 31[g] |
| H | 9-Cl | H | $-CH_2-\phi-Cl$ | 40 | Unknown[d] |
| | | | | 20 | 47[h] |
| 7-$CH_3$ | 10-Cl | H | $-CH_2-\phi-Cl$ | 360E | 19 |
| 8-Cl | 9-$OCH_3$ | H | $-CH_2-\phi-Cl$ | 360E | Unknown[d] |
| | | | | 40 | 65[b] |

[a] Concentration of test compound expressed as μg. compound per ml. total test volume. Many compounds were not soluble at the usual test concentration of 400 μg./ml. In such cases, the suspension obtained was filtered and the supernatant liquid tested. The concentration of the compound was estimated and is so indicated by an "E" adjacent to the estimated value. Dilutions of this original supernatant liquid to give less concentrated solutions

Table IV (cont.)

[a](cont.) for testing necessarily resulted in solutions having an estimated concentration of test compound.

[b]1.66 percent compound-induced lysis.

[c]1.7 percent compound-induced lysis.

[d]Essentially complete compound-induced lysis.

[e]0.5 percent compound-induced lysis.

[f]0.85 percent compound-induced lysis.

[g]1.25 percent compound-induced lysis.

[h]0.82 percent compound-induced lysis.

UNITED STATES PATENT AND TRADEMARK OFFICE
CERTIFICATE OF CORRECTION

PATENT NO. : 3,897,434
DATED : July 29, 1975
INVENTOR(S) : Allen S. Katner

It is certified that error appears in the above-identified patent and that said Letters Patent are hereby corrected as shown below:

Column 19, line 26, "quiazolin" should read --quinazolin--.

Column 20, line 21, insert a comma at the end of the line, after "acetylenedicarboxylate"; line 22, insert a period at the end of the line after "hours"; line 24, "anc" should read --and--; line 25, "solic" should read --solid--, but will apply to the Grant only.

Column 21, line 37, "$C_1$-$C_3$al-" should read --$C_1$-$C_3$ al- --; line 38, "$C_1$-$C_3$alkoxy" should read --$C_1$-$C_3$ alkoxy--.

Signed and Sealed this eighth Day of June 1976

[SEAL]

Attest:

RUTH C. MASON
Attesting Officer

C. MARSHALL DANN
Commissioner of Patents and Trademarks